United States Patent Office 3,144,434
Patented Aug. 11, 1964

3,144,434
POLYESTER-CONTAINING POLYIMIDAZOLINES
Elizabeth C. Dearborn, Boston, and Philip K. Isaacs, Brookline, Mass., assignors to W. R. Grace & Co., Cambridge, Mass., a corporation of Connecticut
No Drawing. Filed Mar. 22, 1961, Ser. No. 97,458
9 Claims. (Cl. 260—75)

This invention relates to a class of compounds which serve a dual function as plasticizers and curing agents for polyvinyl chloride compositions. In a particular aspect, it relates to complex organic compounds which comprise polyimidazolines containing a plurality of ester groups disposed internally within their molecular structure.

Plasticized polyvinyl chloride compositions have gained extensive use because of their rapid curing time, low cost, ease of handling, and are particularly adaptable for molding, casting films, coating and a host of other applications. Plasticizers are generally added to such polymers to improve molding properties, increase plasticity and pliability, and augment resistance to moisture, chemicals and other conditions. Such compositions depend on the fact that the polymer is relatively insoluble in plasticizer at room temperature, yet soluble at elevated temperatures. To obtain maximum physical properties, it is necessary to fuse the compositions at temperatures of about 170 to 200° C.

Notwithstanding the desirable attributes of such compositions, they are subject to certain limitations which make them unsuitable in many applications. A serious deficiency is the extractability of the plasticizer by oils and solvents which impairs the flexible character of the polymer. Another failing of plasticized stocks is their thermoplastic nature which precludes their use at high temperatures. Another fault is that such compositions adhere poorly to other than vinyl surfaces.

A large number of compounds are currently available as plasticizers for polyvinyl chloride. None, however, is designed to greatly increase adhesion, lower extractability and thermoplasticity in a single step. The use of polymerizing plasticizers, such as the glycol dimethacrylates, does reduce extraction and eliminate thermoplasticity but it also causes hardening. Adhesion is not improved. Addition of epoxy resins and curing agents aid adhesion but extractable plasticizer is always present and the product must be used very shortly after mixing in the catalyst.

The present invention is based upon the discovery of a class of complex organic substances which when used as the sole plasticizers and fluid medium for polyvinyl chloride overcomes the objections to the prior art compositions. This discovery stems from the well-known fact that amines can be used as effective curing agents for polyvinyl chloride. Amines, however, usually cause rapid darkening and embrittlement of the polymer. In this invention, a plasticizer-curing agent is provided which comprises a polyester plasticizer chemically combined with a polyimidazoline. When compounded with polyvinyl chloride, the prior art objections are overcome due to the fact that heating produces crosslinkages rather than mere fluxing. In the novel combination, the imidazoline portion of the molecule becomes chemically attached to the polyvinyl chloride, thereby attaching the plasticizing polyester as well. This chemical "grafting" prevents extraction of the plasticizer by strong solvents. Furthermore, the uncured polymeric compositions are of stable viscosity and require no catalyst for cure.

Polymers containing the novel compounds of this invention are not linear but three dimensional or crosslinked. They exhibit physical properties in accord with this type of structure, being rubber-like and infusible. At the earlier stages in the curing process, the polymers are capable of being molded into desired shapes after which further heating carries the reaction to completion, producing infusible products. Such products assume the characteristics of thermoset polymers.

Briefly stated, the polyester-containing polyimidazolines of this invention are conveniently prepared in three steps. In the first step, a suitable glycol is contacted with an excess amount of an aliphatic dicarboxylic acid to give a polyester terminated with carboxylic acid groups. In a separate second step, a compound containing both primary amine groups and imidazoline rings is prepared by the reaction of one mole of an aliphatic monocarboxylic acid and one mole of an alkylene polyamine. The final product is obtained in step 3 which involves the reaction of the product of step 1 and the product of step 2.

In preparing the first intermediate involved in obtaining the ultimate compound of this invention, step 1 is carried out by reacting 4 moles of a saturated straight chain aliphatic dicarboxylic acid and 3 moles of a glycol. Suitable acid reactants are those containing from 3 to 10 carbon atoms and are represented by such acids as malonic, succinic, glutaric, adipic, pimelic, suberic, azelaic, and sebacic acid. Suitable glycols encompass those containing 2 to 10 carbon atoms such as ethylene glycol, diethylene glycol, triethylene glycol, 1,2-propanediol, 1,3-propanediol, 1,6-hexanediol, and neopentyl glycol.

The requisite amounts of acid and glycol are charged to a mixing vessel and continuously agitated throughout the reaction period. The reaction may be hastened by suitable esterification catalysts, such as sulfuric, hydrochloric and p-toluenesulfonic acids. A small amount of the catalyst, generally between about 0.1 percent to 0.5 percent based on the weight of the dicarboxylic acid reactant has been found sufficient to promote ester formation.

To protect this system and the final product of step 3 against catalytic pro-oxidant metals during synthesis, there is added to the mixture a small amount of a chelating and inactivating agent. These metals, which are introduced as impurities in the glycol and acid reactants, catalyze degradation of the ester and of the final product with resultant darkening and viscosity increase. The agent is added in amounts sufficient to react with substantially all of the impurities present in the acid and glycol. The amount of such impurities which appear in the commercially-available reactants is of such small order that generally between about 0.1 percent to 0.5 percent by weight based on the combined weight of the acid reactant and glycol has been found effective. Suitable agents include the alkali metal polyphosphates, such as sodium and potassium tripolyphosphate.

After all components have been charged to the vessel, the mixture is deoxygenated in a stream of nitrogen at a pressure of about 20 millimeters Hg for about 20 minutes before beginning to heat the reaction mixture. A fractionating column is provided and maintained at about 100° C. so that only the water of reaction is distilled and the water is continuously removed as formed. Good agitation is maintained through the reaction period.

Esterification is effected by treating the mixture at various pressures and temperatures which are adjusted periodically. Heating commences at low temperature and moves progressively higher with the pressure and temperature being inversely related according to the following schedule:

| Time period for which pressure and temperature gradients are held, minutes | Temp., °C. | Pressure, mm. Hg. |
|---|---|---|
| 120 | 25-150 | 690 |
| 90 | 150-200 | 690 |
| 10 | 200 | 500 |
| 15 | 200 | 450 |
| 45 | 200 | 35 |

The reaction is complete after a total period of about 4½ to 5 hours has elapsed. Thereafter, the product is first cooled under nitrogen to 150° C. and then collected. Using azelaic acid and diethylene glycol as exemplary reactants being processed according to the foregoing description of step 1, the idealized reaction of the resulting polyester may be postulated as follows:

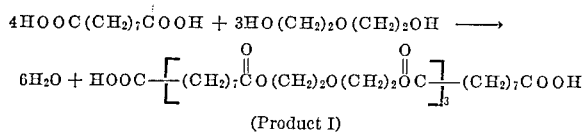

(Product I)

Step 2, covering preparation of a compound containing both primary amine groups and imidazoline rings, is carried out separately from step 1 and involves contacting, under reactive conditions of temperature and pressure, one mole of an aliphatic monocarboxylic acid and one mole of a polyamine of the formula

where $n$ is a whole number having the value 1 to 4. Suitable acids are straight chain aliphatic monocarboxylic acids containing 1 to 18 carbon atoms, such as acetic, caproic, pelargonic, lauric, palmitic, stearic and oleic acids. The preferred acids are those containing 9 to 18 carbon atoms. Representative polyamines which are effective include diethylene triamine, triethylene tetramine, tetraethylene pentamine, and pentaethylene hexamine.

In preparing the product of step 2, one mole of an aliphatic monocarboxylic acid is charged to a mixing vessel and agitated. It is deoxygenated in a stream of nitrogen at a pressure of about 15 mm. Hg for about 15 to 20 minutes and then the vacuum is released and a blanketing stream of nitrogen is applied throughout the reaction. Thereafter, the acid is heated to about 70° C. and one mole of polyamine is added. At this point the temperature rises to about 100° C. due to salt formation.

The system is protected during synthesis against the catalytic effect of metallic impurities which may be present in the amine and acid. The procedure here is akin to that which is practiced in preparing the step 1 product. This involves the addition of a chelating and inactivating agent, such as sodium and potassium tripolyphosphate. The agent is added in amounts sufficient to react with substantially all of the metallic impurities present in the reactants and generally between about 0.1 percent to 0.5 percent by weight based on the total weight of the acid and polyamine has been found to be satisfactory.

The mixture is then heated at 1 atmosphere to about 150° C. at which point the pressure and temperature are adjusted periodically in inverse relationship according to the following schedule:

| Heating period in minutes after reaction mixture has reached 150° C. at 1 atm. | Temp., °C. | Pressure, mm. Hg |
|---|---|---|
| 20 | 152.5 | 585 |
| 40 | 152.2 | 435 |
| 60 | 155 | 335 |
| 80 | 165 | 235 |
| 100 | 182.5 | 135 |
| 120 | 192.5 | 110 |
| 140 | 202.5 | 85 |
| 160 | 212.5 | 35 |
| 180 | 220 | 15 |

Since water catalyzes side reactions and hydrolyzes imidazolines, it is continuously removed as formed in order to achieve maximum conversion to imidazoline. The above schedule permits water removal as rapidly as possible consistent with imidazoline conversion. About 25 percent of the polyamine distills instead of reacting with the acid which indicates that part of the product consists of a diimidazoline. This is attributed to the fact that one molecule of polyamine reacts with the carboxylic group of two molecules of acid. Since the reaction ratio is 1:1, there is nothing for a corresponding amount of polyamine with which to react and, therefore, it distills.

During the reaction period, the agitator should be run at a high rate of speed to give a high surface turnover of the mixture for rapid water removal. An agitator speed of about 100 to 200 r.p.m. has been found to be effective. Experiments have shown that low water removal caused by decreasing the speed from about 150 to 65 r.p.m. lowered the imidazoline content by about 10 percent due to irreversible hydrolysis of the imidazoline ring.

After a temperature of about 220° C. and a pressure of about 15 mm. Hg have been reached over about a three-hour period and according to the foregoing schedule, this pressure and temperature are held and the reaction mixture is heated for an additional hour under these conditions. Thereafter, the product is cooled to 150° C. under nitrogen and collected.

The reaction yields a mixture of products comprising a major amount of an amino-containing imidazoline having the following idealized structure (Product II) in which the initial reactants are represented by oleic acid and triethylene tetramine:

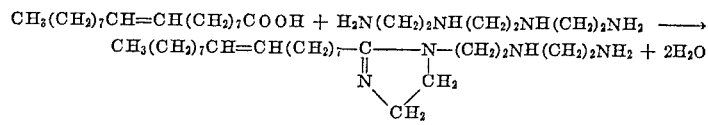

(Product II)

The minor amount of the reaction product comprises unconverted amides, N-substituted amides, and species of imidazolines and polyimidazolines having higher and lower molecular weights than the molecular weight of the idealized imidazoline (Product II).

The complex polyester-containing polyimidazoline of this invention is obtained in step 3. This involves reacting the product of step 2 and the product of step 1. The reactants are charged to a mixing vessel, thoroughly agitated, and then deoxygenated in stream of nitrogen at a pressure of 20 mm. Hg for 20 minutes at which time the vacuum is released. Thereafter, a blanket of nitrogen is applied and the mixture is heated according to the following schedule while holding the pressure constant.

| Time period for which temperature gradients are held, minutes | Temp., °C. | Pressure, mm. Hg |
|---|---|---|
| 120 | 25–185 | 20 |
| 40 | 185–200 | 20 |
| 45 | 200–235 | 20 |
| 90 | 235–240 | 20 |

After a heating period of about 5 hours has elapsed, the reaction mixture is cooled to 150° C. under nitrogen and the product is then collected. The product is essentially derived by reacting the acid groups of the ester of Product I with the primary amine groups of the imidazoline of Product II. Using as specific reactants azelaic acid and diethylene glycol to prepare Product I and oleic acid and triethylene tetramine to prepare Product II, the idealized structure of the polyester-containing polyimidazoline (Product III) resulting therefrom may be postulated as follows:

was prepared by mixing 686 grams of Product I and 752 grams of Product II. The mixed products were then processed according to the description hereinbefore given, and after carefully observing the time-temperature-pressure schedule, the mixture was cooled under nitrogen to 150° C. and the product was collected.

Other Products I were prepared by reacting the following combinations of acid and glycol in molar ratios of 4:3; azelaic acid and neopentyl glycol; azelaic acid and propylene glycol; adipic acid and propylene glycol; and sebacic acid and ethylene glycol. A variation of Product II was prepared by reacting one mole pelargonic acid and one mole diethylene triamine. Corresponding Products III are obtained by various combinations of Products I and II.

The superiority of the polyester-containing polyimidazoline of this invention over a conventional plasticizer when compounded with polyvinyl chloride is reflected in Example 2.

*Example II*

| Ingredient | Sample A | Sample B |
|---|---|---|
|  | (weight in grams) | |
| Geon 121 (paste grade polyvinyl chloride) | 30 | 30 |
| Product III of Example I | 100 | 0 |
| Dioctyl phthalate | 0 | 100 |

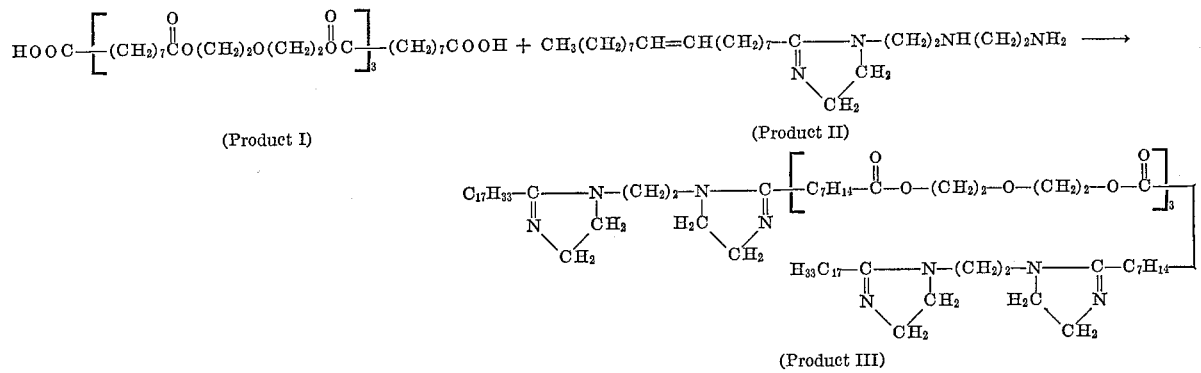

(Product I)   (Product II)

(Product III)

The invention is further illustrated by the following examples:

*Example I*

Product I was prepared by mixing 4,517 grams (24 moles) of azelaic acid, 1,910 grams (18 moles) of diethylene glycol, 4.5 grams of p-toluenesulfonic acid as catalyst, and 6.4 grams of powdered sodium tripolyphosphate as the metal chelating and inactivating agent. The mixture was treated according to the procedure described hereinbefore, care being exercised in adhering to the time-temperature-pressure schedule. After treating the mixture for about 4 hours and 40 minutes, it was cooled under nitrogen to 150° C. and 670 milliliters of distillate were recovered.

Product II was prepared by mixing 4,520 grams (16 moles) of oleic acid, 2,339 grams (16 moles) of triethylene tetramine, and 6.8 grams of sodium tripolyphosphate as the metal chelating and inactivating agent. The mixture was processed according to the procedure outlined hereinbefore. After heat-treating it according to the prescribed time-temperature-pressure schedule, the mixture was cooled under nitrogen to 150° C. and the product was collected.

The polyester-containing polyimidazoline (Product III)

The solubility and extractability factors for each sample were as follows:

| Sample | 200° C. Cure (minutes) | Soluble in cyclohexanone | Percent extraction in toluene | Physical properties of cured polymer |
|---|---|---|---|---|
| A | 1 | Yes | 75 | Weak and soft; flows above 150° C. |
| B | 1 | Yes | 75 | Do. |
| A | 2 | No | 25 | Strong rubber-like and soft; does not flow at 200° C. |
| B | 2 | Yes | 75 | Weak and soft; flows above 150° C. |
| A | 5 | No | 18 | Strong, rubber-like and slightly harder than 2-minute cure; does not flow at 200° C. |
| B | 5 | Yes | 75 | Weak and soft; flows above 150° C. |

The insolubility in cyclohexanone of sample A indicates that a cross-linked polymer existed. In addition, the pliability of the cured polymer is representative of a plasticized material. The outstanding solvent and heat resistant, thermosetting, non-extractive and tough rubber-like properties of the cured polymer make it suitable for a wide variety of industrial applications. It is particularly

We claim:
1. The product derived by (1) reacting 3 moles of a glycol containing 2 to 10 carbon atoms and 4 moles of an aliphatic dicarboxylic acid containing 3 to 10 carbon atoms; (2) separately reacting 1 mole of an aliphatic monocarboxylic acid containing 1 to 18 carbon atoms and 1 mole of a polyamine having the formula

$$NH_2(CH_2CH_2NH)_nCH_2CH_2NH_2$$

when n is a whole number having the value 1 to 4; and (3) reacting the product of step (2) with the product of step (1), each of said steps (1), (2) and (3) being carried out in a deoxygenated system and while continuously removing the water of reaction formed during each step.

2. A product according to claim 1 wherein the glycol is diethylene glycol and the dicarboxylic acid is azelaic acid.

3. A product according to claim 1 wherein the glycol is neopentyl glycol and the dicarboxylic acid is azelaic acid.

4. A product according to claim 1 wherein the glycol is propylene glycol and the dicarboxylic acid is azelaic acid.

5. A product according to claim 1 wherein the glycol is propylene glycol and the dicarboxylic acid is adipic acid.

6. A product according to claim 1 wherein the glycol is ethylene glycol and the dicarboxylic acid is sebacic acid.

7. A product according to claim 1 wherein the monocarboxylic acid contains 9 to 18 carbon atoms.

8. A product according to claim 2 wherein the polyamine is triethylene tetramine and the monocarboxylic acid is oleic acid.

9. A product according to claim 1 wherein the polyamine is diethylene triamine and the monocarboxylic acid is pelargonic acid.

References Cited in the file of this patent

UNITED STATES PATENTS

| | | |
|---|---|---|
| 2,048,778 | Brubaker | July 28, 1936 |
| 2,461,918 | Petke | Feb. 14, 1949 |